US012673833B2

(12) United States Patent
    Iattoni

(10) Patent No.: US 12,673,833 B2
(45) Date of Patent: Jul. 7, 2026

(54) DEVICE FOR ORDERLY TRANSFER OF PRODUCTS

(71) Applicant: FLEXLINK SYSTEMS S.P.A., Rivoli (IT)

(72) Inventor: Vitaliano Iattoni, San Lazzaro di Savena (IT)

(73) Assignee: FLEXLINK SYSTEMS S.P.A., Rivoli (IT)

( * ) Notice: Subject to any disclaimer, the term of this patent is extended or adjusted under 35 U.S.C. 154(b) by 146 days.

(21) Appl. No.: 18/713,337

(22) PCT Filed: Nov. 22, 2022

(86) PCT No.: PCT/IB2022/061254
    § 371 (c)(1),
    (2) Date: May 24, 2024

(87) PCT Pub. No.: WO2023/094978
    PCT Pub. Date: Jun. 1, 2023

(65) Prior Publication Data
    US 2025/0011104 A1     Jan. 9, 2025

(30) Foreign Application Priority Data
    Nov. 25, 2021     (IT) ........................ 102021000029861

(51) Int. Cl.
    *B65G 47/51*     (2006.01)
    *B65G 15/02*     (2006.01)
    *B65G 17/08*     (2006.01)

(52) U.S. Cl.
    CPC .......... *B65G 47/5113* (2013.01); *B65G 15/02*
        (2013.01); *B65G 17/086* (2013.01); *B65G*
        *2207/24* (2013.01)

(58) Field of Classification Search
    CPC ...... B65G 15/02; B65G 17/086; B65G 21/16;
        B65G 47/5113; B65G 47/5145; B65G
        47/684; B65G 2207/24
    See application file for complete search history.

(56) References Cited

U.S. PATENT DOCUMENTS 3,297,133 A * 1/1967 Sterling ............... B65G 47/256
                                                        198/398
    3,300,022 A * 1/1967 Sterling .................. B65B 35/26
                                                        53/313
                    (Continued)

FOREIGN PATENT DOCUMENTS

EP          1537035 A1     6/2005
    EP          1461275 B1     8/2006
                    (Continued)

OTHER PUBLICATIONS

International Search Report and Written Opinion received for PCT/IB2022/061254 dated Apr. 23, 2023.

*Primary Examiner* — Gene O Crawford
*Assistant Examiner* — Keith R Campbell
(74) *Attorney, Agent, or Firm* — Levenfeld Pearlstein, LLC

(57)     ABSTRACT
A device (10) for the orderly transfer of products (T), comprising a continuous conveyor belt (12) closed on itself having an upper transport branch for a plurality of products (T) defining an advancement path wound around a central point starting from a radially internal portion (Ai) to a radially external portion (Ae), wherein said upper transport branch comprises a plurality of curvilinear sections comprising a first curvilinear section (26) and a second curvilinear section (28) radially more external with respect to the first curvilinear section (26), wherein the first curvilinear
                    (Continued)

section (26) and the second curvilinear section (28) are side by side and adjacent to each other in the radial direction (R).

18 Claims, 4 Drawing Sheets

(56)                    References Cited

U.S. PATENT DOCUMENTS

| | | | |
|---|---|---|---|
| 3,664,487 A | 5/1972 | Ballenger | |
| 6,612,417 B2 * | 9/2003 | Garvey | B65G 47/684 |
| | | | 198/607 |
| 6,689,407 B2 * | 2/2004 | Shefet | B65G 21/18 |
| | | | 426/465 |
| 7,757,837 B2 * | 7/2010 | Jones | B65G 29/00 |
| | | | 198/392 |
| 7,775,344 B2 * | 8/2010 | Balk | B65G 17/005 |
| | | | 198/575 |
| 7,823,718 B2 * | 11/2010 | Spencer | B65G 47/5131 |
| | | | 198/594 |
| 9,382,076 B1 | 7/2016 | Earling et al. | |
| 10,442,636 B2 * | 10/2019 | Maibach | B65G 47/24 |
| 10,702,899 B2 | 7/2020 | Daniel et al. | |
| 2007/0124395 A1 | 5/2007 | Edge et al. | |
| 2012/0103762 A1 * | 5/2012 | Balk | B65G 23/28 |
| | | | 198/817 |
| 2014/0167024 A1 | 6/2014 | Iwase et al. | |
| 2017/0026895 A1 | 1/2017 | Murakami et al. | |
| 2018/0290187 A1 | 10/2018 | Daniel et al. | |

FOREIGN PATENT DOCUMENTS

| | | |
|---|---|---|
| EP | 2066573 A2 | 6/2009 |
| EP | 2013118 B1 | 7/2013 |
| EP | 2953871 B1 | 4/2017 |
| EP | 1458636 B1 | 6/2017 |
| EP | 3362383 B1 | 5/2020 |
| WO | 98/54988 A1 | 12/1998 |
| WO | 2007/124395 A1 | 11/2007 |
| WO | 2014/167024 A1 | 10/2014 |
| WO | 2017/026895 A1 | 2/2017 |

* cited by examiner

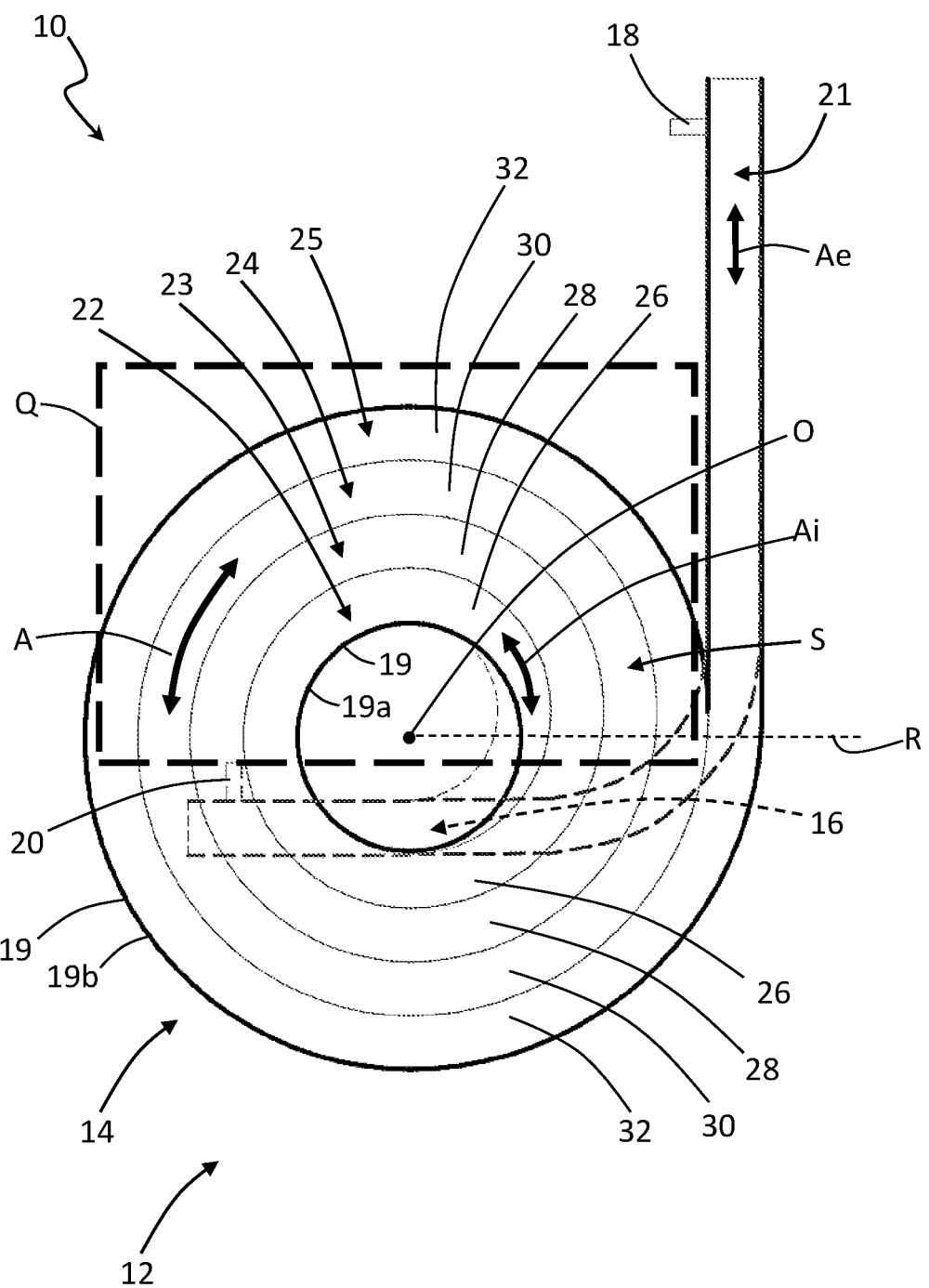
<u>FIG. 1</u>

DEVICE FOR ORDERLY TRANSFER OF PRODUCTS

CROSS-REFERENCE TO RELATED APPLICATION DATA

This application is a US National Stage Application of International Application No. PCT/IB2022/061254, filed Nov. 22, 2022, which claims the benefit of and priority to Italian Patent Application No. 102021000029861, filed Nov. 25, 2021, the disclosures of which are incorporated herein in their entireties.

BACKGROUND

The present invention relates to a transfer device for orderly transfer of products for a manufacturing line.

Transfer devices for orderly transfer of products are usually employed to receive a plurality of products as input and to move such products arranging them in an orderly manner at the output.

In manufacturing lines for the production, packaging and, more generally, processing of products, transfer devices for orderly transfer of products are routinely used which receive products from a processing station at a supply frequency and prepare the received products to be directly or indirectly supplied to a further processing station at the same or a different supply frequency.

Examples of products that can be used in combination with transfer devices for orderly transfer of products may be bottles, flasks, caps, and other objects, even semi-finished ones, preferably capable of standing independently on their own support surface, usually a base.

Transfer devices for orderly transfer of products usually have an input portion for products and an output portion for products, where in the output portion the products are arranged in a single row or in several ordered rows, and where in the input portion the products can be supplied already ordered according to the same ordering pattern as in the output portion, or where the products are supplied in a disorderly way.

Document EP3362383A1 describes a device for orderly transfer of products in the form of a temporary cap storage device in which an orderly sequence of caps is supplied to an input portion and transferred in the same order to an output portion. This device comprises a rotary table having an input portion located in a central region thereof and an output portion located in a peripheral area. Above the rotary table, a fixed diverter in the shape of an Archimedes spiral is placed at an adjustable distance. The rotary table is set into rotation below the fixed diverter. The products are introduced at the center of the diverter, namely at the center of the spiral, with the rotary table rotating. The products, transported in rotation by the rotary table, are diverted by the spiral walls of the diverter in such a way that they reach the output portion where the spiral has an output section.

Document US2018/0290187A1 describes a device for the orderly transfer of products in the form of a product accumulation table rotatably mounted on a support frame and driven in rotation by an electric motor. The accumulation table is delimited in a radially outer direction by an edge with a substantially circular shape, which has an output opening at a product output region. There is also a deflector fixed with respect to the accumulation table, mounted above the accumulation table, which is configured to intercept products dragged in rotation by the accumulation table and divert them towards the output region. This deflector is placed at a predetermined distance from the edge so as to create a narrowing to force the transported products to be arranged in an orderly row. The products laid according to a disorderly pattern on the rotary accumulation table are transported by the rotation of the accumulation table to the deflector, being forced to accumulate in front of the deflector in order to pass one at a time through the narrowing between the deflector and the side, subsequently entering the output opening arranged in a single, orderly row.

SUMMARY

The Applicant noted that in the devices for the orderly transfer of products such as those described in EP3362383A1 and in US2018/0290187A1, the products are subjected to numerous impacts and shocks against each other and against deflectors or diverters.

The Applicant also noted that in the devices for the orderly transfer of products such as those described in EP3362383A1 and US2018/0290187A1, the products are subjected to sliding between their own sidewalls, against the sidewalls of the deflectors or diverters, and between their own base or resting surfaces and the rotary tables.

The Applicant has verified that impacts and shocks may result in damages to the products, especially when products are delicate.

The Applicant has also verified that sliding can deteriorate the side and base walls of the products, for example by altering their appearance (e.g. in the case of products that may have been recently painted) or by ruining labels or the like applied to the side surfaces of products.

The Applicant has also verified that shocks, impacts and sliding of products can cause non-negligible noise that negatively impacts the quality of the working environment of operators working in proximity of devices for the orderly transfer of products.

The Applicant has perceived the need for transfer devices for the orderly transfer of products capable of transferring a plurality of products in an orderly way from a radially internal to a radially external portion (or from a radially external to a radially internal portion) that minimise any damages to the products, that alternatively or in combination minimise a possible deterioration of the side and base walls of the products, and that alternatively or in combination do not generate any excessive noise.

The Applicant has perceived that by transporting the products without the need for them to be diverted from the advancement path followed by means of diverters or deflectors, it could be possible to avoid shocks, impacts and sliding both among the products themselves and between the products and such diverters or deflectors.

The Applicant has also perceived that by transporting the products without the need for them to be diverted from the advancement path followed, sliding between the support bases of the products and the surface defining the advancement path could be avoided.

The Applicant has found that by providing a conveyor belt capable of accommodating the products and transferring a force to the products capable of accompanying them in an orderly manner following an advancement path wound around a central point starting from a radially internal portion to a radially external portion, it would be possible to transfer a plurality of products in an orderly manner from a radially internal portion to a radially external portion, or vice versa, without the need to provide diverters or deflectors interacting with the products to divert them from the path they follow.

The present invention therefore concerns a transfer device for orderly transfer of products comprising a continuous conveyor belt that is closed on itself.

Preferably, the continuous conveyor belt closed on itself comprises an upper transport branch for a plurality of products that defines an advancement path.

Preferably, such an advancement path is wound around a central point from a radially internal portion to a radially external portion.

In an embodiment, preferably, an advancement direction of the upper transport branch of the conveyor belt along the advancement path extends from the radially internal to the radially external portion of the advancement path.

Preferably, the upper transport branch comprises a plurality of curvilinear sections.

In an embodiment, preferably, said curvilinear sections of the plurality of curvilinear sections lie on a common plane.

Preferably, the plurality of curvilinear sections comprises a first curvilinear section and a second curvilinear section.

Preferably, the second curvilinear section is radially more external than the first curvilinear section.

Preferably, the first curvilinear section and the second curvilinear section are side by side and adjacent to each other in the radial direction.

In an embodiment, preferably the upper transport branch comprises a plurality of loops.

In an embodiment, preferably the first curvilinear section belongs to a first loop of said plurality of loops, and the second curvilinear section belongs to a second loop of said plurality of loops.

In an embodiment, preferably each loop of said plurality of loops defines a complete turn about said central point.

In an embodiment, preferably, the device comprises a containment edge.

In an embodiment, preferably, the containment edge is placed in a radially more internal position with respect to a radially more internal loop of the plurality of loops.

In an embodiment, preferably, the containment edge is at least partially overlapping said radially more internal loop of the plurality of loops.

The Applicant has verified that by arranging the products on the upper transport branch, the upper transport branch transmits an advancement force to the products that is capable of transporting the products substantially integrally with the conveyor belt along the advancement path.

The Applicant has further verified that the plurality of curvilinear sections comprising a first curvilinear section and a second curvilinear section in which the second curvilinear section is radially more external with respect to the first curvilinear section and in which the first curvilinear section and the second curvilinear section are side by side and adjacent to each other in the radial direction, creates a substantially flat surface that is wider than the width of a single section of conveyor belt, allowing the products to be arranged also in a random manner on the upper transport branch between the first curvilinear section and the second curvilinear section.

The Applicant was able to verify that the particular conformation of the upper transport branch, in which the second curvilinear section is radially more external with respect to the first curvilinear section and in which the first curvilinear section and the second curvilinear section are side by side and adjacent to each other in the radial direction, ensures the progressive orderly movement of the products along the advancement path without the need to resort to diverters or deflectors to divert the products from the advancement path.

The Applicant has verified that this allows to order products transported along one or more rows along the transport path even if the products are randomly loaded onto the upper transport branch.

The transfer device for orderly transfer of products according to the invention therefore also works as an ordering device for ordering products.

The Applicant has also verified, that even a single product positioned anywhere on the upper transport branch, e.g. at the most internal (or most external) portion, tends to reach the radially most external (or most internal) portion, without the need for interposed diverters or deflectors to divert products from the advancement path.

In a further aspect, the invention relates to an ordering device for ordering products comprising a continuous conveyor belt that is closed on itself.

Preferably, the continuous conveyor belt closed on itself comprises an upper transport branch for a plurality of products that defines an advancement path.

Preferably, such an advancement path is wound around a central point starting from a radially internal portion to a radially external portion.

Preferably, the upper transport branch comprises a plurality of curvilinear sections.

Preferably, the plurality of curvilinear sections comprises a first curvilinear section and a second curvilinear section.

Preferably, the first curvilinear section and the second curvilinear section are side by side and adjacent to each other in the radial direction.

Preferably, the upper transport branch of the conveyor belt advances along the advancement path at the second curvilinear section with an angular speed different from the angular speed at the first curvilinear section.

In the present description and in the appended claims, "radial direction", "radially" and similar expressions mean any direction passing through a central point around which the advancement path is wound.

In the present description and the appended claims, "side by side and adjacent in the radial direction" when referring to two stretches of the upper transport branch is meant to indicate that said two stretches are spaced apart in the radial direction by an amount less than the width of the upper transport branch, more preferably less than half the width of the upper transport branch, more preferably less than one third of the width of the upper transport branch, more preferably less than one fifth of the width of the upper transport branch, more preferably less than one tenth of the width of the upper transport branch, more preferably less than one twentieth of the width of the upper transport branch, more preferably less than one fortieth of the width of the upper transport branch.

In the present description and in the appended claims, "distance between two curvilinear sections in the radial direction" means the distance between a radially more external edge of the upper transport branch section, which defines the radially most internal curvilinear section, and a radially more internal edge of the upper transport branch section, which defines the radially most external curvilinear section.

In the present description and in the appended claims, "width of the upper transport branch" or in general "width of the conveyor belt" is meant to indicate its dimension in the transverse direction with respect to the advancement path.

In the present description and in the appended claims, "loop" is meant to indicate a complete winding around a central point. A loop of the upper transport branch is understood to be a complete winding of the upper transport branch around a central point.

In the present description and the appended claims, "loop radially preceding another loop" is meant to indicate a loop radially more internal and subsequent to another loop.

Similarly, in the present description and the appended claims, "loop radially subsequent to another loop" is meant to indicate a loop radially more external and subsequent to another loop.

In the present description and in the appended claims, "curvilinear", "curved" and similar terms are meant to indicate an element having a finite radius of curvature.

In the present description and the appended claims, "straight" means an element with an infinite radius of curvature.

When the terms "curvilinear" and "straight" are used with reference to a section of the upper transport branch of the conveyor belt, a finite or infinite curvature is meant to be indicated, of the advancement path followed by the conveyor belt at that section of the upper transport branch. The advancement path can be considered to be substantially coincident with the course of the centerline of the upper transport branch of the conveyor belt.

In the present description and the appended claims, the "average radius of curvature" of a curvilinear section is meant to indicate the arithmetic mean of the radii of the osculating circles of each point on a centerline of the upper transport branch at the curvilinear section, the "osculating circle" meaning the circle that best approximates the local curvature of a line.

In the present description and in the appended claims, "radius of curvature" at a point on a curvilinear section is meant to indicate a radius of curvature assessed at a point along the centerline of the upper transport branch at that curvilinear section.

In the present description and in the appended claims, the "center of curvature" of a point on a curvilinear section is meant to indicate the center of the osculating circle of a point on the centerline of the upper transport branch at that curvilinear section.

In the present description and the appended claims, the "centerline of the upper transport branch" is meant to indicate the location of the points equidistant from two opposite, radially spaced peripheral edges of the upper transport branch of the conveyor belt.

In the present description and subsequent claims, the expressions "downstream" and "upstream" are used with reference to an advancement direction of the upper transport branch along the advancement path, when the device is in use.

In the present description and in the appended claims, "length of a section of the upper transport branch" or in general "length of a section of the conveyor belt" means an extension of such a section along the advancement path.

The present invention may have, in all the aspects discussed above, at least one of the preferred features described below. Such features may therefore be present individually or in combination, except where expressly stated otherwise, either in the device of the first aspect of the present invention or in the device of the further aspect of the present invention.

Preferably, it is provided to provide a conveyor belt continuous and closed on itself having an upper transport branch for a plurality of products defining an advancement path wound around a central point starting from a radially internal portion to a radially external portion.

Preferably, it is provided to provide said upper transport branch with a plurality of curvilinear sections comprising a first curvilinear section and a second curvilinear section radially more external with respect to the first curvilinear section, wherein the first curvilinear section and the second curvilinear section are side by side and adjacent to each other in the radial direction.

Preferably, it is provided to position a plurality of products on said upper transport branch at said first curvilinear and second curvilinear sections.

Preferably, it is provided to advance the upper transport branch along the advancement path.

Preferably, it is provided to provide a continuous conveyor belt closed on itself having an upper transport branch for a plurality of products defining an advancement path wound around a central point starting from a radially internal portion to a radially external portion.

Preferably, it is provided to provide said upper transport branch with a plurality of curvilinear sections comprising a first curvilinear section and a second curvilinear section radially more external with respect to the first curvilinear section, wherein the first curvilinear section and the second curvilinear section are side by side and adjacent to each other in the radial direction.

Preferably, it is provided to position a plurality of products on said upper transport branch at said first curvilinear and second curvilinear sections.

Preferably, at least one product of said plurality of products is positioned so as to simultaneously rest on said first curvilinear section and said second curvilinear section.

Preferably, it is provided to advance the upper transport branch along the advancement path at the second curvilinear section with an angular speed different from the angular speed at the first curvilinear section.

Preferably, the device according to the invention is configured to allow the movement of at least one product positioned so as to simultaneously rest on a pair of curvilinear sections side by side and adjacent to each other towards the second curvilinear section.

Preferably, no active deflector or diverter is provided on the upper transport branch configured to divert the path of the products transported by the conveyor belt.

Preferably, said curvilinear sections of the plurality of curvilinear sections are sections of the upper transport branch that are distinct from each other and defined along the advancement path.

Preferably, said curvilinear sections of the plurality of curvilinear sections are not placed on planes that are offset from one another.

Preferably, it is provided to transport the products placed on the upper transport branch along the advancement path.

Preferably, transporting the products along the advancement path is carried out with the products resting on the upper transport branch.

Preferably, the loops of said plurality of loops lie along a common plane.

Preferably, the loops of said plurality of loops are not located on mutually offset planes.

Preferably, each loop extends around the central point along a section of the transport path that subtends a 360° angle whose vertex corresponds to the central point.

Preferably, each loop of the plurality of loops comprises at least one curvilinear section of the plurality of curvilinear sections.

Preferably, each loop of the plurality of loops comprises a respective plurality of curvilinear sections.

Preferably, curvilinear sections of one loop of the plurality of loops are side by side and adjacent in the radial direction to curvilinear sections of a different loop of the plurality of loops.

Preferably, the first loop is the radially most internal loop of the plurality of loops.

Preferably the first loop comprises a plurality of first curvilinear sections.

Preferably the second loop comprises a plurality of second curvilinear sections.

Preferably, each first curvilinear section is side by side and adjacent in the radial direction to a respective second curvilinear section.

Preferably, there is no deflector or diverter active on the upper transport branch configured to move the products transported by the conveyor belt from one loop to another.

Preferably, the distance in the radial direction separating each first curvilinear section from a respective second curvilinear section is less than half the largest dimension of a support base of the products to be transported.

Preferably, each loop of the plurality of loops is side by side and adjacent along its entire length to a different loop of the plurality of loops.

Preferably, a respective average radius of curvature is defined for each curvilinear section of the plurality of curvilinear sections.

Preferably, curvilinear sections of the plurality of curvilinear sections belonging to different loops define different respective average radii of curvature from each other.

Preferably, the first curvilinear section and the second curvilinear section define different respective average radii of curvature from each other.

Preferably, the second curvilinear section defines a larger average radius of curvature than the average radius of curvature defined by the first curvilinear section.

Preferably, the average radius of curvature of any curvilinear section of the plurality of curvilinear sections coincides with a radius of curvature at any point of said any curvilinear section.

Preferably, each curvilinear section of the plurality of curvilinear sections has a constant radius of curvature along its entire length.

In such case, preferably the second curvilinear section has a larger constant radius of curvature than the first curvilinear section.

Preferably, a radius of curvature of a curvilinear section belonging to any one loop of the plurality of loops is concentric to a radius of curvature of a curvilinear section adjacent thereto belonging to a different loop of the plurality of loops.

Preferably, the curvilinear sections belonging to any one loop of the plurality of loops are concentric to the corresponding side by side and adjacent curvilinear sections belonging to a different loop.

Preferably, a radius of curvature of a curvilinear section belonging to any one loop of the plurality of loops is related to a radius of curvature of a curvilinear section side by side and adjacent thereto belonging to a radially more internal loop of the plurality of loops, where present, by the relationship (1):

$$R_{n+1} > R_n + L \qquad (1)$$

wherein:

n is an integer comprised between 1 and the total number of loops of the upper transport branch;

$R_n$ and $R_{n+1}$ respectively denote the radius of curvature of an n-th loop and the radius of curvature of an (n+1)-th loop, radially successive to the n-th loop; and L is the width of the upper transport branch of the conveyor belt.

Preferably, a radius of curvature of a curvilinear section belonging to any one loop of the plurality of loops is related to a radius of curvature of a curvilinear section side by side and adjacent to it belonging to a radially more internal loop of the plurality of loops, where present, by the relationship (2):

$$R_{n+1} = R_n + L + d \qquad (2)$$

wherein:

n is an integer comprised between 1 and the total number of loops of the upper transport branch;

$R_n$ and $R_{n+1}$ denote, respectively, the radius of curvature of an n-th loop and the radius of curvature of an (n+1)-th loop, radially successive to the n-th loop;

L is the width of the upper transport branch of the conveyor belt; and d is the distance in the radial direction between the two curvilinear sections.

Preferably, the advancement path at each curvilinear section belonging to each loop follows a course defined by an arc of a circle subtending an angle comprised between 10° and 180°.

Preferably, when the advancement path at each curvilinear section belonging to each loop follows a course defined by an arc of a circle subtending an angle of 180°, each loop of the plurality of loops comprises two curvilinear sections along the advancement path.

Preferably, when each loop of the plurality of loops comprises two curvilinear sections along the advancement path, the radius of curvature of the first curvilinear section first encountered following the advancement path A from the radially most internal portion to the radially most external portion of the advancement path A is related to the radius of curvature of a subsequent first curvilinear section along the advancement path A by the relationship (3):

$$R_2 > R_1 + 1/2 L \qquad (3)$$

wherein:

$R_1$ denotes the radius of curvature of the curved section encountered as first along a same loop following the advancement path from a radially more internal portion to a radially more external portion;

$R_2$ denotes the radius of curvature of the curved section encountered as second along a same loop following the advancement path from a radially more internal portion to a radially more external portion; and L is the width of the upper transport branch of the conveyor belt.

Preferably, when each loop of the plurality of loops comprises two curvilinear sections along the advancement path, the radius of curvature of the first curvilinear section first encountered following the advancement path A from the radially more internal portion to the radially more external portion of the advancement path A is related to the radius of curvature of a subsequent first curvilinear section along the advancement path A by the relationship (4):

$$R_2 > R_1 + 1/2\,L + 1/2\,d \qquad (4)$$

wherein:

$R_1$ denotes the radius of curvature of the curved section encountered first along a same loop following the advancement path from a radially more internal portion to a radially more external portion;

$R_2$ denotes the radius of curvature of the curved section encountered second along a same loop following the advancement path from a radially more internal portion to a radially more external portion;

L is the width of the upper transport branch of the conveyor belt; and d is the distance in radial direction between the two curvilinear sections.

Preferably, the upper transport branch of the conveyor belt advances along the advancement path at a constant transport speed.

Preferably, the transport speed is defined as the ratio between the distance between any two points on the advancement path and the time required for the conveyor belt to travel that distance while advancing along the advancement path.

Preferably, the angular velocity of the upper transport branch at curvilinear sections that are side by side and adjacent in the radial direction is different.

Preferably, the angular velocity is defined as the ratio between the angle described by a curvilinear section of the upper transport branch along the advancement path and the time required for the conveyor belt to sweep this angle as it advances along the advancement path.

Preferably, along any one curvilinear section of the plurality of curvilinear sections, the upper transport branch of the conveyor belt advances along the advancement path with a constant angular velocity.

Preferably, the upper transport branch of the conveyor belt advances along the advancement path at the second curvilinear section with an angular speed different from the angular speed at the first curvilinear section.

Preferably, the upper transport branch of the conveyor belt advances along the advancement path at the second curvilinear section with a lower angular velocity than the angular velocity at the first curvilinear section.

Preferably, the angular velocity of curvilinear sections of one loop is different from the angular velocity of curvilinear sections of a different loop.

Preferably, the angular velocity of the curvilinear sections of the plurality of loops decreases from the radially most internal loop towards the radially most external loop.

The Applicant has verified that when products are loaded randomly onto the upper transport branch of the conveyor belt, some products may come to rest simultaneously on two curved, adjacent sections side by side in the radial direction of the upper transport branch.

The Applicant has perceived that by advancing side by side and adjacent curvilinear sections in the radial direction at different angular velocities, the products simultaneously resting on two side by side and adjacent curvilinear sections in the radial direction are subjected to a thrust that tends to move the products radially away from the curvilinear section with the higher angular velocity and to bring the products closer to the curvilinear section with the lower angular velocity.

The Applicant has found that by arranging such curvilinear sections adjacent and side by side in the radial direction of an adequate length along the transport direction, the products simultaneously resting on two curvilinear sections side by side and adjacent in the radial direction would be placed on the curvilinear section with the lower angular velocity.

The Applicant has verified that this allows to order products transported along one or more rows along the transport path better even if the products are randomly loaded onto the upper transport branch.

Preferably, at least one product is positioned so as to simultaneously rest on two curvilinear sections side by side and adjacent to each other in the radial direction of said plurality of curvilinear sections of the upper transport branch.

Preferably, when the upper transport branch advances along the advancement path, the at least one product positioned so as to simultaneously rest on a pair of curvilinear sections that are side by side and adjacent to each other moves towards the curvilinear section of the pair with the lower angular velocity.

Preferably, the device according to the invention is configured to allow the movement of at least one product positioned so as to simultaneously rest on a pair of curvilinear sections side by side and adjacent to each other towards the curvilinear section of the pair with the lower angular velocity.

Preferably, at least one product is positioned so as to simultaneously rest on the first curvilinear section and the second curvilinear section.

Preferably when the transport branch is advancing along the advancement path, said at least one product positioned so as to simultaneously rest on the first and second curvilinear sections moves towards the second curvilinear section.

Preferably, when a product is resting on a single curvilinear section, such product makes no relative movement with respect to the upper transport branch of the advancement path while the upper transport branch advances along the advancement path.

Preferably, the upper transport branch comprises a plurality of straight sections.

Preferably, said straight sections of the plurality of v sections are section of the upper transport branch that are distinct from each other and defined along the advancement path.

Preferably, each loop of the plurality of loops comprises at least one straight section of the plurality of straight sections.

More preferably, each loop of the plurality of loops comprises a respective plurality of straight sections.

Preferably, straight sections of one loop of the plurality of loops are side by side and adjacent in the radial direction to straight sections of a different loop of the plurality of loops.

Preferably, the distance in the radial direction separating each straight section of a loop from a corresponding straight section of an adjacent loop is less than half the largest dimension of a support base of the products to be transported.

Preferably, straight sections of one loop of the plurality of loops are parallel to corresponding straight sections of all the other loops of the plurality of loops.

Preferably, each straight section is placed between two curvilinear sections of the same loop.

Preferably, each straight section is adjacent along the advancement path to two curvilinear sections of the same loop.

Preferably, each loop comprises at least one pair of straight sections that are parallel to each other and separated along the advancement path by two curvilinear sections.

Preferably, when a product is resting on a single straight section, that product makes no relative movement with respect to the upper transport branch of the advancement path while the upper transport branch advances along the advancement path.

Preferably, when a product is positioned so as to simultaneously rest on two side by side and adjacent straight sections in the radial direction, that product remains simultaneously resting on those two straight sections while the upper transport branch advances along the advancement path.

Preferably, when a product is resting on a single loop, that product makes no relative movement with respect to the upper transport branch of the advancement path while the upper transport branch advances along the advancement path.

Preferably, the upper transport branch comprises an output portion located at the radially external portion of the advancement path.

Preferably, products placed on the upper transport branch should be transported to the output portion of the upper transport branch.

Preferably, said output portion is at least partly straight.

Preferably, one or more containment edges are provided.

Preferably, a first containment edge is placed in a radially internal position with respect to the radially most internal loop of the plurality of loops.

Alternatively or in addition, a second containment edge is located in a radially more external position with respect to the radially most external loop of the plurality of loops.

Preferably, the containment edge is at least partially overlapping the radially most internal loop.

Preferably, the first containment edge is at least partially overlapping the radially most internal loop.

Preferably, the conveyor belt comprises a lower return branch continuously connected to the radially internal and radially external portions of the advancement path.

Preferably, the conveyor belt is dimensioned to accommodate a single row of products.

Preferably, the width of the conveyor belt is greater than the maximum dimension of a support base for the transported products.

Preferably, the width of the conveyor belt is greater than twice the maximum dimension of a support base for the transported products.

Preferably, the width of the conveyor belt is less than three times the maximum dimension of a support base for the transported products.

Preferably, it is provided to transport products placed on the upper transport branch from the radially internal to the radially external portion of the advancement path.

Preferably, it is provided to transport products positioned on the upper transport branch at the radially external portion of the advancement path aligned in a single row.

In other embodiments, it is provided to transport products positioned on the upper transport branch at the radially external portion of the advancement path aligned in several parallel rows.

Preferably, the conveyor belt is moved by a first motor located downstream of the upper transport branch and active on the conveyor belt.

Preferably, the first motor is positioned at the radially internal portion of the advancement path.

Preferably, a second motor is provided, positioned upstream of the upper transport branch.

Preferably, the second motor is positioned at the radially external portion of the advancement path or the output portion of the upper transport branch, if present.

Preferably, the transfer device for orderly transfer is adapted to transport products of similar shape and size, e.g. selected from flasks, bottles, vials, caps, etc.

BRIEF DESCRIPTION OF DRAWINGS

Further characteristics and advantages of the present invention will become clearer from the following detailed description of a preferred embodiment thereof, with reference to the appended drawings and provided by way of indicative and non-limiting example, in which:

FIG. 1 is a schematic top view of a transfer device for orderly transfer according to a first embodiment of the invention;

DETAILED DESCRIPTION OF DRAWINGS

Figures 2, 3:
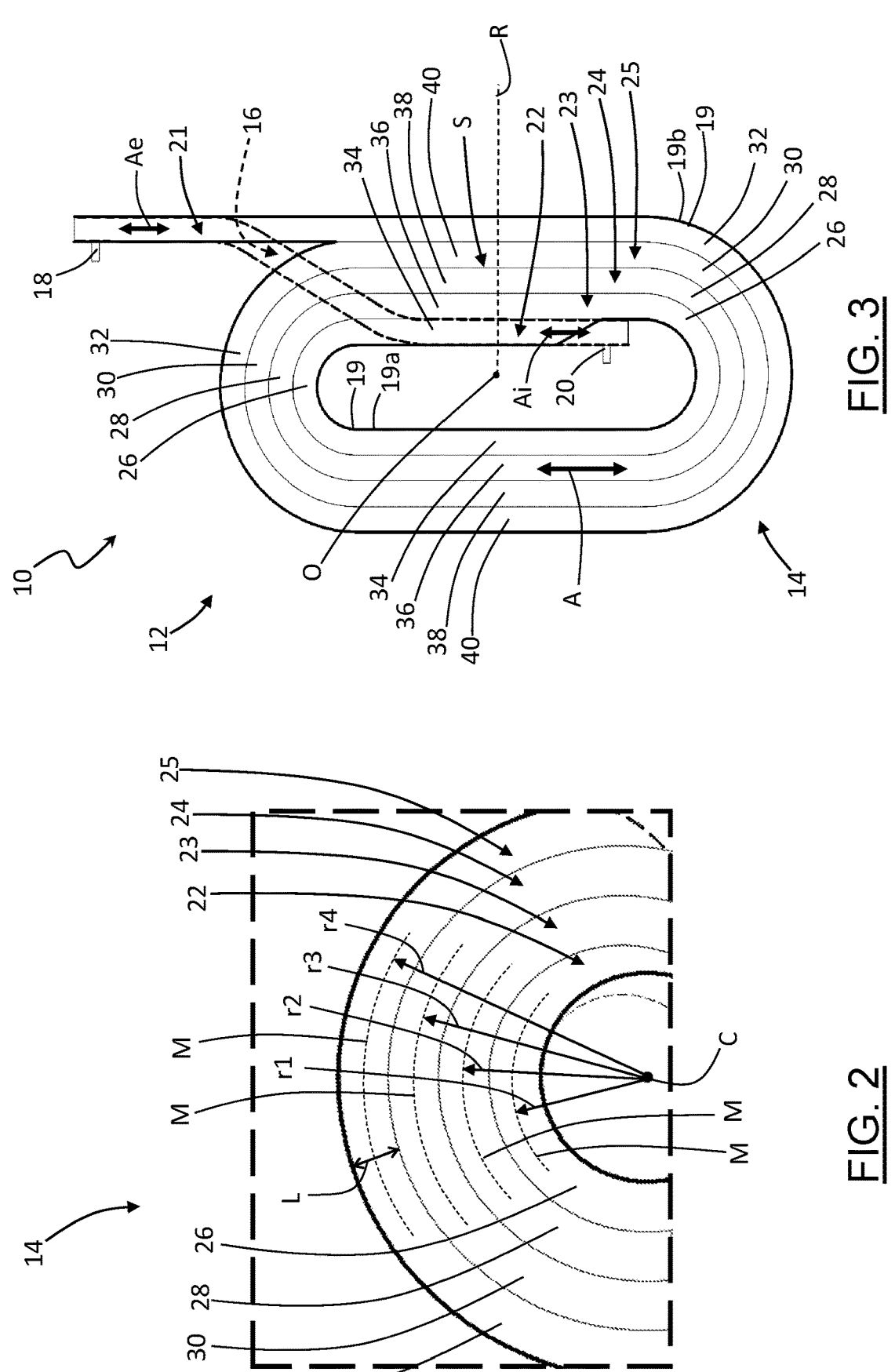
FIG. 2 is an enlarged view of the detail delimited by the dashed box Q in FIG. 1.
FIG. 3 is a schematic view from above of a transfer device for orderly transfer according to a second embodiment of the invention.

The representations in the appended figures do not necessarily have to be understood to scale and do not necessarily respect the proportions of the various parts. In the figures, identical or similar elements will be indicated by the same reference numbers.

With reference to FIGS. 1-5, a transfer device for orderly transfer is described according to various embodiments in accordance with the invention, indicated by reference 10.

The device 10 comprises a continuous conveyor belt 12 closed on itself, comprising an upper transport branch 14 and a lower return branch 16. The lower return branch 16 extends below the upper transport branch 14. In FIGS. 1-5, the lower return branch 16 is represented with dotted lines.

The conveyor belt 12 is of the type made of a link transport chain. The link transport chain is configured to be able to flex outside of a transport chain lying plane. The link transport chain is further configured to be able to flex within the transport chain lying plane, so that it can follow a curved path that develops at least partially on a lying plane.

The links of such a transport chain each comprise an upper resting surface adapted to receive products to be transported. The upper resting surface is preferably shaped like a substantially flat surface having a plurality of notches and teeth arranged adjacent to a front end and to a rear end of the link. The notches and teeth are configured to match corresponding notches and teeth of an adjacent link.

The conveyor belt 12 is mounted on a support frame (not shown) that may include a housing track within which the conveyor belt 12 is arranged. Such a housing track, when present, extends along a path that essentially coincides with an advancement path A of the upper transport branch 14.

The conveyor belt 12 runs on a plurality of pulleys comprising a first pulley 18 and a second pulley 20 at which the conveyor belt 12 passes from the upper transport branch 14 to the lower return branch 16 and vice versa.

At the upper transport branch 14, the conveyor belt 12 is arranged in such a way as to define a transport surface S adapted to accommodate the products to be transported, which in the appended figures faces the observer.

The conveyor belt 12 defines the advancement path A at the upper transport branch 14. The advancement path A is wound around a central point O. The central point O is a reference point completely surrounded by the upper transport branch 14. This central point O can be located at a geometrically central position with respect to the advancement path A.

In the case shown in the figures, at the upper transport branch 14 the conveyor belt 12 extends from a radially internal portion Ai to a radially external portion Ae of the advancement path A.

At the radially external portion Ae of the advancement path A, the upper transport branch 14 comprises a straight output portion 21. At the end of the output portion 21, the conveyor belt 12 is wound around the first pulley 18 and travels along the lower return branch 16 and reaches the second pulley 20, around which it is wound to travel back along the upper transport branch 14. The second pulley 20 is positioned at the radially internal portion Ai of the advancement path A. As illustrated in the appended figures, the second pulley 20 is positioned at a radially more internal portion of the advancement path A.

The first pulley 18 is positioned at the radially most external portion Ae of the advancement path A. As illustrated in the appended figures, the first pulley 18 is positioned at a radially more external portion of the advancement path A.

The conveyor belt 12 is driven by one or more electric motors (not shown), active on the first and second pulleys 18, 20. Electric motors provide for advancing the conveyor belt 12 at a constant speed along the advancement path A.

The upper transport branch 14 comprises a plurality of loops 22-25, each defining a complete turn of the conveyor belt 12 around the central point O.

FIG. 1 shows four loops 22-25, but their number is generally comprised between two and forty, preferably comprised between two and twenty, more preferably comprised between two and ten.

The loops of the plurality of loops 22-25 are radially adjacent to each other and subsequent along the advancement path A.

As shown in the appended figures, a second loop 23 of the plurality of loops 22-25 is radially adjacent and more external with respect to a first loop 22 and is connected to the first loop 22 along the advancement path A. A third loop 24 of the plurality of loops 22-25 is radially adjacent and more external with respect to a second loop 23 and is connected to the second loop 23 along the advancement path A. The second loop 23 is located along the advancement path A between the first loop 22 and the third loop 24. A fourth loop 25 of the plurality of loops 22-25 is radially adjacent and more external with respect to the third loop 24 and is connected to the third loop 24 along the advancement path A. The third loop 24 is located along the advancement path A between the second loop 23 and the fourth loop 25.

The first loop 22 extends from the most radially internal portion of the advancement path A. The radially most external loop, in the illustrated embodiments the fourth loop 25, ends at the output portion 21.

The plurality of loops 22-25 defines the transport surface S. The transport surface S is essentially contained in a single plane.

The device 10 may comprise one or more containment edges 19. The containment edges 19 delimit the upper transport branch 14 in the radial direction R.

A first containment edge 19a is placed in a radially more internal position with respect to the first loop 22 and adjacent to the first loop 22. As shown in the attached figures, the first containment edge 19a is partially overlapping the first loop 22. A second containment edge 19b is placed radially more external with respect to the radially most external loop and adjacent to the radially most external loop.

The upper transport branch 14 comprises a plurality of curvilinear sections. Said plurality of curvilinear sections comprises first curvilinear sections 26. The first curvilinear sections 26 are located along the first loop 22. Said plurality of curvilinear sections also comprises second curvilinear sections 28. The second curvilinear sections 28 are located along the second loop 23. Said plurality of curvilinear sections also comprises third curvilinear sections 30. The third curvilinear sections 30 are located along the third loop 24. Said plurality of curvilinear sections also comprises fourth curvilinear sections 32. The fourth curvilinear sections 32 are placed along the fourth loop 25.

The number of first curvilinear sections 26 is comprised between two and ten, preferably comprised between two and four. The number of first curvilinear sections 26 depends on the overall shape of the upper transport branch 14.

Figures 4, 5:
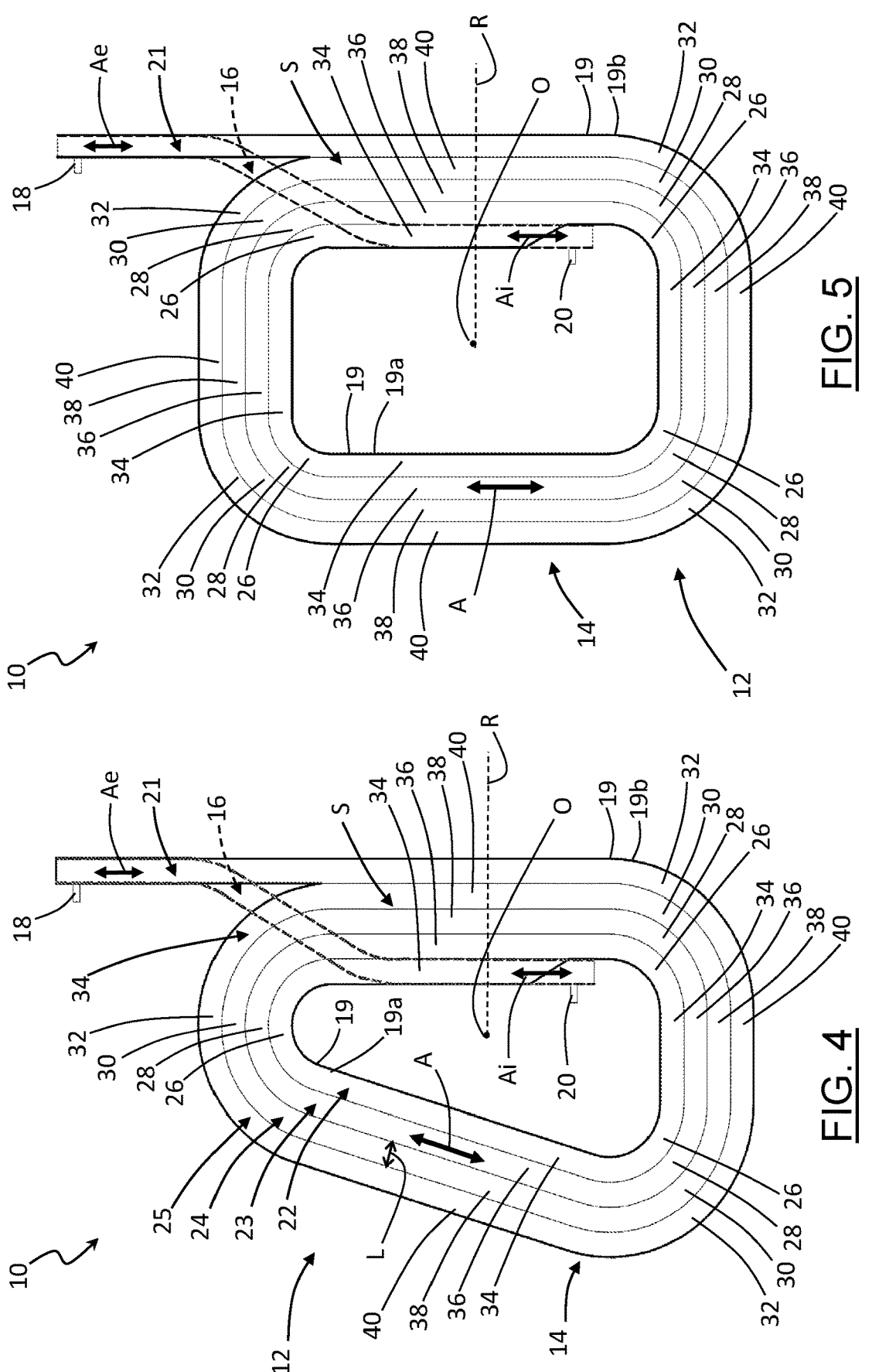
FIG. 4 is a schematic view from above of a transfer device for orderly transfer according to a third embodiment of the invention.
FIG. 5 is a schematic view from above of a transfer device for orderly transfer according to a fourth embodiment of the invention.

In the embodiments of FIGS. 1 and 3, the number of first curvilinear sections 26 is two. In the embodiment of FIG. 4, the number of first curvilinear sections 26 is three. In the embodiment of FIG. 5, the number of first curvilinear sections 26 is four.

The number of first curvilinear sections 26 is equal to the number of second curvilinear sections 28. The number of second curvilinear sections 28 is equal to the number of third curvilinear sections 30. The number of third curvilinear sections 30 is equal to the number of fourth curvilinear sections 32.

For each first curvilinear section 26 there is a corresponding second curvilinear section 28. For each second curvilinear section 28 there is a corresponding third curvilinear section 30. For each third curvilinear section 30 there is a corresponding fourth curvilinear section 32.

Each first curvilinear section 26 is side by side and adjacent in the radial direction R to the corresponding second curvilinear section 28. The distance in the radial direction R between the first curvilinear section 26 and the corresponding second curvilinear section 28 is the minimum distance sufficient to avoid sliding or interference in movement between the first curvilinear section 26 and the second curvilinear section 28.

Each second curvilinear section 28 is side by side and adjacent in the radial direction R to the corresponding third curvilinear section 30. The distance in the radial direction R between the second curvilinear section 28 and the corresponding third curvilinear section 30 is the minimum distance sufficient to avoid sliding or interference in movement between the second curvilinear section 28 and the third curvilinear section 30.

Each third curvilinear section 30 is side by side and adjacent in the radial direction R to the corresponding fourth curvilinear section 32. The distance in the radial direction R between the third curvilinear section 30 and the corresponding fourth curvilinear section 32 is the minimum distance sufficient to avoid sliding or interference in movement between the third curvilinear section 30 and the fourth curvilinear section 32.

The distance in the radial direction R between any two adjacent, side by side curvilinear sections in the radial direction R of the upper transport branch 14 is equal.

The distance in the radial direction R between any two radially adjacent loops of the plurality of loops 22-25 is constant along the entire upper transport branch 14.

The distance in the radial direction R between any two radially adjacent loops of the plurality of loops 22-25 is equal to the distance in the radial direction R between any two adjacent, side by side curvilinear sections in the radial direction R of the upper transport branch 14.

Each curvilinear section has a respective radius of curvature. That radius of curvature is defined by the distance between a centerline M of the conveyor belt 12 and the center C of the tangent circle to that centerline M. Such a tangent circle coincides with an osculating circle Os when the radius of curvature is constant along the entire curvilinear section.

In the preferred embodiment of the invention, the radius of curvature of each curvilinear section is constant along the entire curvilinear section.

The first curvilinear section 26 has a first radius of curvature r1. The second curvilinear section 28 has a second radius of curvature r2. The third curvilinear section 30 has a third radius of curvature r3. The fourth curvilinear section 28 has a fourth radius of curvature r4.

As better illustrated in FIG. 2, the first radius of curvature r1 is smaller than the second radius of curvature r2. The second radius of curvature r2 is smaller than the third radius of curvature r3. The third radius of curvature r3 is smaller than the fourth radius of curvature r4.

The radii of curvature r1 of the first curvilinear sections 26 are not all equal to each other. Along any one loop of said plurality of loops 22-25, following the advancement path A from the radially most internal portion to the radially most external portion of the advancement path A, at least one curvilinear section following a preceding curvilinear section has a greater radius of curvature than said preceding curvilinear section.

In the embodiments illustrated in FIGS. 1 and 3, the radius of curvature r1 of the first curvilinear section 26 first encountered following the advancement path A from the radially most internal portion to the radially most external portion of the advancement path A is smaller than the radius of curvature r1 of a subsequent first curvilinear section 26 along the advancement path A.

The radii of curvature r2 of the second curvilinear sections 28 are not all equal to each other.

In the embodiments illustrated in FIGS. 1 and 3, the radii of curvature r2 of the second curvilinear sections 28 are different from each other. In the embodiments illustrated in FIGS. 1 and 3, the radius of curvature r2 of the second curvilinear section 28 first encountered following the advancement path A from the radially most internal portion to the radially most external portion of the advancement path A is smaller than the radius of curvature r2 of a subsequent second curvilinear section 28 along the advancement path A.

The radii of curvature r3 of the third curvilinear sections 30 are not all equal to each other.

In the embodiments illustrated in FIGS. 1 and 3, the radii of curvature r3 of the third curvilinear sections 30 are different from each other. In the embodiments illustrated in FIGS. 1 and 3, the radius of curvature r3 of the third curvilinear section 30 first encountered following the advancement path A from the radially most internal portion to the radially most external portion of the advancement path A is smaller than the radius of curvature r3 of a subsequent third curvilinear section 30 along the advancement path A.

The radii of curvature r4 of the fourth curvilinear sections 32 are not all equal to each other.

In the embodiments illustrated in FIGS. 1 and 3, the radii of curvature r4 of the fourth curvilinear sections 32 are different from each other. In the embodiments illustrated in FIGS. 1 and 3, the radius of curvature r4 of the fourth curvilinear section 32 first encountered following the advancement path A from the radially most internal portion to the radially most external portion of the advancement path A is smaller than the radius of curvature r4 of a subsequent fourth curvilinear section 32 along the advancement path A.

In the embodiments illustrated in FIGS. 1 and 3, following the advancement path A from the radially most internal portion to the radially most external portion, the radii of curvature of the curvilinear sections gradually increase.

The radius of curvature of a curvilinear section is equal to the radius of curvature of an adjacent, radially internal curvilinear section increased by the sum of the width L of the conveyor belt 12 and the distance in the radial direction R between the two curvilinear sections.

In the embodiments of FIGS. 1 and 3, the radius of curvature of a curvilinear section following a previous curvilinear section along the advancement path A is equal to the radius of curvature of the previous curvilinear section increased by the sum of the width L of the conveyor belt 12 and the distance in the radial direction R between the two curvilinear sections.

In the embodiments of FIGS. 1, 3 and 5, each curvilinear section of a same loop subtends an angle of 360° divided by the number of curvilinear sections of the loop.

In the embodiment of FIG. 4, each curvilinear section of the same loop subtends an angle of 360° divided by the number of curvilinear sections of the loop, or subtends an angle between 90° and 180°.

In the embodiments of FIGS. 3, 4 and 5, there is a straight section between two curvilinear sections that follow one another along the advancement path A. Each straight section has an infinite radius of curvature.

In the embodiments of FIGS. 3, 4 and 5, a first straight section 34 is interposed between two first curvilinear sections 26. A second straight section 36 is interposed between two second curvilinear sections 28. A third straight section 38 is interposed between two third curvilinear sections 30. A fourth straight section 40 is interposed between two fourth curvilinear sections 32.

In the embodiment of FIG. 1, two curvilinear sections that follow one another along the advancement path A are adjacent to each other.

In use, the conveyor belt 12 is operated at a constant transport speed, such that the ratio between the distance between any two points on the advancement path and the time required for the conveyor belt to travel that distance while advancing along the advancement path is constant in any section of the conveyor belt 12.

A plurality of products T is placed on the upper transport branch 14. By positioning the products at the radially internal portion Ai of the advancement path A, the products remain resting on the conveyor belt 12 and advance integrally with the upper transport branch 14 to the radially external portion Ae of the advancement path A. The products are then supplied to the output portion 21 of the upper transport branch 14 in an orderly manner. In this regard, the conveyor belt 12 is operated in such a way that the direction of the advancement path A is directed from the radially internal portion Ai to the radially external portion Ae.

By positioning the products at the radially external portion Ai of the advancement path A, the products remain resting on the conveyor belt 12 and advance solidly with the upper transport branch 14 to the radially internal portion Ai of the advancement path A. In this regard, the conveyor belt 12 is operated such that the direction of the advancement path A is directed from the radially external portion Ae to the radially internal portion Ai.

The products follow the advancement path A without sliding on the conveyor belt 12 and without bumping into each other.

Figure 6:
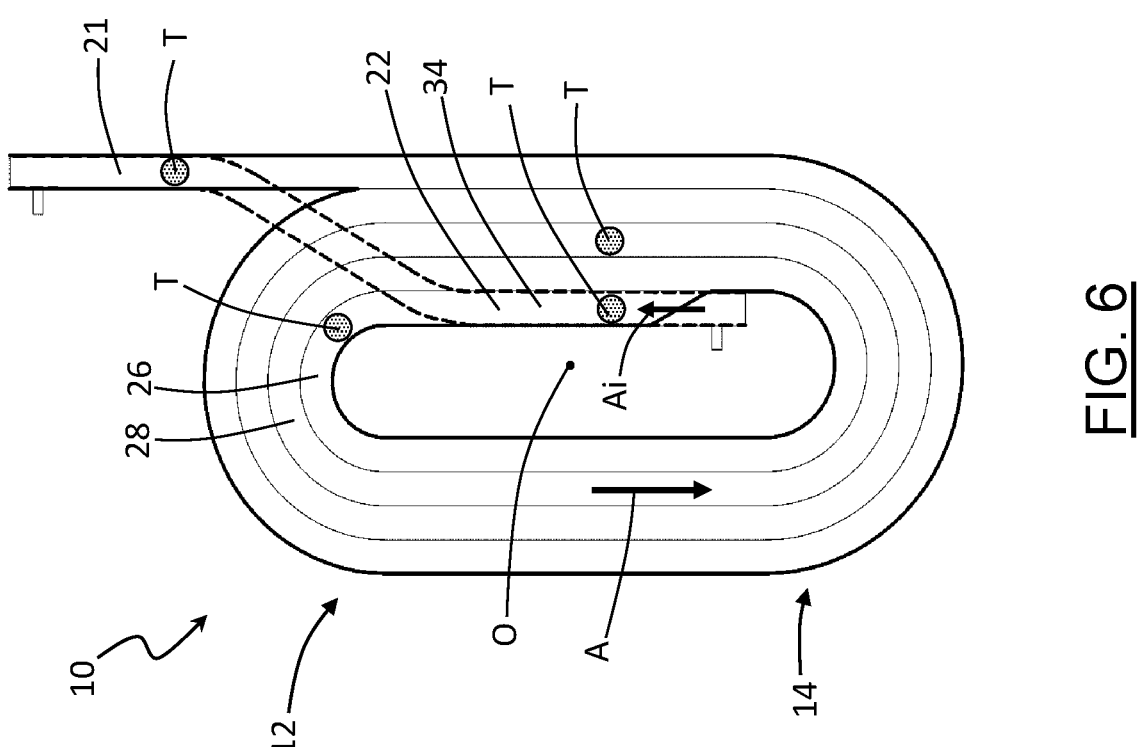
FIG. 6 is a schematic view from above of a transfer device for orderly transfer of FIG. 3 in an operational condition.

As shown in FIG. 6, where only one product has been depicted (for clarity of exposition) at various times, the product T is positioned on the first loop 22 at the radially internal portion Ai of the advancement path A. Subsequently, the product T follows the first loop 22 reaching the first curvilinear section 26. The product T continues along the advancement path A conveyed by the conveyor belt 12 along the remaining portion of the first loop 22, along the entire second loop 23, reaching the third loop 24. The product T continues along the advancement path A conveyed by the conveyor belt 12 along the remaining portion of the third loop 24, along the entire fourth loop 25 and reaches the output portion 21.

From the above, it is clear that by placing a plurality of products in a predetermined order on the upper transport branch 14, this plurality of products reaches the output portion 21 in the same predetermined order.

In the event that one or more products are positioned so as to simultaneously rest on two radially adjacent loops, and in particular at two curvilinear sections that are side by side and adjacent in the radial direction, the products tend to move to the radially most external curvilinear section between the two curvilinear sections.

As mentioned above, the radially most external curvilinear section has a greater radius of curvature than the radially most internal curvilinear section. Since the transport speed of the conveyor belt 12 along the upper transport branch 14 is constant, the radially most external curvilinear section advances with a lower angular velocity than the radially most internal curvilinear section. The difference in angular velocity between the radially most external curvilinear section and the radially most internal curvilinear section tends to rotate the product and move it radially towards the outside.

In the event that one or more products are positioned so as to simultaneously rest on two radially adjacent loops, and in particular at two straight sections that are side by side and adjacent in the radial direction, the products remain simultaneously resting on both loops along the entire straight section.

Figure 7:
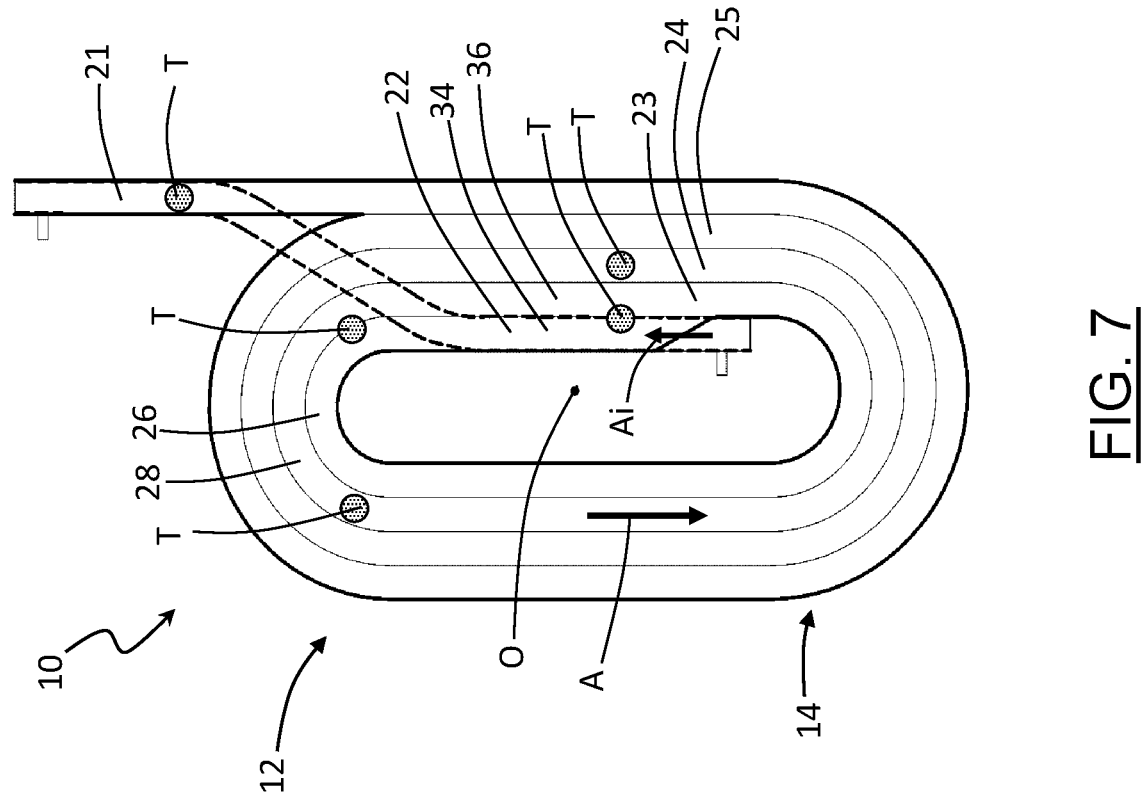
FIG. 7 is a schematic view from above of a transfer device for orderly transfer of FIG. 3 in a different operational condition.

As shown in FIG. 7, wherein only one product has been represented (for clarity of exposition) at different instants, the product T is positioned so as to simultaneously rest on the first loop 22 and on the second loop 23 of the upper transport branch 14, at the first straight section 34 of the first loop 22 and the second straight section 36 of the second loop 23, in proximity to the radially internal portion Ai of the advancement path A. Thereafter, the product T advances following the advancement path A while remaining simultaneously resting on the first straight section 34 and on the second straight section 36, until it reaches the first curvilinear section 26 of the first loop 22 and the second curvilinear section 28 of the second loop 23. The product T, simultaneously resting on the first curvilinear section 26 and on the second curvilinear section 28, continues to advance following the advancement path A. The product T tends to move on the second curvilinear section 28, due to the difference in angular velocity between the second, radially most external curvilinear section 28 and the first, radially most internal curvilinear section 26.

In the event that the product has completely shifted on the second curvilinear section 28 (as shown in FIG. 7), the product T continues along the advancement path A in support on a single loop. The product T is transported by the conveyor belt 12 along the remaining portion of the second loop 23 to the third loop 24. The product T continues along the advancement path A conveyed by the conveyor belt 12 along the remaining portion of the third loop 24, along the entire fourth loop 25 and reaches the output portion 21 of the upper transport branch 14.

In the event that the product has not moved completely on the second curvilinear section 28, the product T continues along the advancement path A simultaneously resting on two radially adjacent loops. This transport condition remains if the product T is travelling along straight sections. When the product T reaches further curvilinear sections that are side by side and adjacent, the product T is simultaneously resting on two curvilinear sections and continues to advance following the advancement path A. The product T tends to move on the radially most external curvilinear section due to the difference in angular velocity between the two straight sections.

Continuing to travel along successive curvilinear sections along the advancement path, the product T moves on a single loop, subsequently reaching the output portion 21.

By placing a plurality of products in random order on the upper transport branch 14, this plurality of products reaches the output portion 21 in one or more ordered rows.

Obviously, a person skilled in the art, in order to satisfy specific and contingent needs, can make numerous modifications and variations to the invention described above while remaining within the scope of protection defined by the following claims.

The invention claimed is:

1. A transfer device for the orderly transfer of products, comprising a continuous conveyor belt closed on itself having an upper transport branch for a plurality of products defining an advancement path wound around a central point starting from a radially internal portion to a radially external portion, wherein an advancement direction of the upper transport branch of the conveyor belt along said advancement path extends from the radially internal portion to the radially external portion of the advancement path, wherein said upper transport branch comprises a plurality of curvilinear sections lying on a common plane, said plurality of curvilinear sections comprising a first curvilinear section and a second curvilinear section radially more external with respect to the first curvilinear section, wherein the first curvilinear section and the second curvilinear section are side by side and adjacent to each other in a radial direction, wherein said upper transport branch comprises a plurality of loops, wherein said first curvilinear section belongs to a first loop of said plurality of loops, and said second curvilinear section belongs to a second loop of said plurality of loops, wherein each loop of said plurality of loops defines a complete turn about said central point, characterized in that said device comprises a containment edge placed radially internally with respect to a most radially internal loop of said plurality of loops, said containment edge at least partially overlapping said most radially internal loop of the plurality of loops.

2. The transfer device according to claim 1, wherein said upper transport branch advances with a constant transport speed, wherein said transport speed is defined as the ratio between the distance between any two points on the advancement path and the time required to cover said distance.

3. The transfer device according to claim 1, wherein for each curvilinear section of said plurality of curvilinear sections a respective average radius of curvature is defined, said first curvilinear section and second curvilinear section defining respective average radii of curvature different from each other, so that the upper transport branch of the conveyor belt advances along the advancement path at the second curvilinear section with an angular speed different from the angular speed at the first curvilinear section.

4. The transfer device according to claim 3, wherein the average radius of curvature of the first curvilinear section is smaller than the average radius of curvature of the second curvilinear section.

5. The transfer device according to claim 1, wherein said first loop comprises a plurality of first curvilinear sections and said second loop comprises a plurality of second curvilinear sections, each first curvilinear section being side-by-side and adjacent in the radial direction to a respective second curvilinear section.

6. The transfer device according to claim 1, wherein each loop of said plurality of loops comprises a respective plurality of curvilinear sections, wherein curvilinear sections of one of the loops are side by side and adjacent in the radial direction to curvilinear sections of a different one of the loops.

7. The transfer device according to, claim 3 wherein each curvilinear section of said plurality of curvilinear sections has a constant radius of curvature throughout its entire length.

8. The transfer device according to claim 6, wherein the curvilinear sections of a same loop of the plurality of loops are adjacent to each other along the advancement path.

9. The transfer device according to claim 6, wherein each loop comprises at least one straight section placed between two of the curvilinear sections of the same loop of the plurality of loops.

10. The transfer device according claim 5 wherein the advancement path at each curvilinear section belonging to each loop follows a course defined by an arc of circumference subtending an angle comprised between 10° and 180°.

11. The transfer device according to claim 1, wherein said upper transport branch comprises an exit portion at least partly rectilinear placed at the radially external portion of the advancement path.

12. The transfer device according to claim 1, wherein the conveyor belt comprises a lower return branch continuously connected to the radially internal portion and to the radially external portion of the advancement path.

13. The transfer device according to claim 1, wherein said first curvilinear section and said second curvilinear section are spaced from each other in the radial direction by an amount less than one fifth of a width of the upper transport branch.

14. The transfer device according to claim 5, wherein each curvilinear section of said plurality of curvilinear sections has a constant radius of curvature throughout its entire length.

15. The transfer device according to claim 6, wherein each curvilinear section of said plurality of curvilinear sections has a constant radius of curvature throughout its entire length.

16. The transfer device according to claim 8, wherein the advancement path at each curvilinear section belonging to each loop follows a course defined by an arc of circumference subtending an angle comprised between 10° and 180°.

17. The transfer device according to claim 9, wherein the advancement path at each curvilinear section belonging to each loop follows a course defined by an arc of circumference subtending an angle comprised between 10° and 180°.

18. The transfer device according to claim 12, wherein said first curvilinear section and said second curvilinear section are spaced from each other in the radial direction by an amount less than one fifth of a width of the upper transport branch.

* * * * *